US006967757B1

(12) United States Patent
Allen et al.

(10) Patent No.: US 6,967,757 B1
(45) Date of Patent: Nov. 22, 2005

(54) MICROELECTROMECHANICAL MIRRORS AND ELECTRICALLY-PROGRAMMABLE DIFFRACTION GRATINGS BASED ON TWO-STAGE ACTUATION

(75) Inventors: James J. Allen, Albuquerque, NM (US); Michael B. Sinclair, Albuquerque, NM (US); Jeffrey L. Dohner, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 189 days.

(21) Appl. No.: 10/722,237

(22) Filed: Nov. 24, 2003

(51) Int. Cl.[7] .............................................. G02B 26/08
(52) U.S. Cl. ..................... 359/224; 359/212; 359/291; 359/295; 359/298
(58) Field of Search ............................. 359/212, 223, 359/224, 290–292, 295, 298

(56) References Cited

U.S. PATENT DOCUMENTS

| | | | |
|---|---|---|---|
| 5,757,536 | A | 5/1998 | Ricco et al. |
| 5,804,084 | A | 9/1998 | Nasby et al. |
| 5,867,302 | A * | 2/1999 | Fleming ..................... 359/291 |
| 5,905,571 | A | 5/1999 | Butler et al. |
| 5,999,319 | A | 12/1999 | Castracane |
| 6,028,689 | A * | 2/2000 | Michalicek et al. ........ 359/224 |
| 6,329,738 | B1 | 12/2001 | Hung et al. |
| 6,433,917 | B1 * | 8/2002 | Mei et al. ................... 359/292 |
| 6,512,625 | B2 * | 1/2003 | Mei et al. ................... 359/290 |
| 6,708,491 | B1 * | 3/2004 | Weaver et al. ............... 60/527 |
| 6,808,952 | B1 * | 10/2004 | Sniegowski et al. .......... 438/48 |
| 2002/0012490 | A1 | 1/2002 | Farmer, III et al. |
| 2002/0149834 | A1 * | 10/2002 | Mei et al. .................... 359/295 |
| 2002/0167245 | A1 | 11/2002 | Hung et al. |
| 2002/0167695 | A1 | 11/2002 | Senturia |
| 2002/0191913 | A1 | 12/2002 | Hocker et al. |
| 2003/0072068 | A1 | 4/2003 | Deutsch et al. |

OTHER PUBLICATIONS

Hung, et al, "Extending the Travel Range of Analog-Tuned Electrostatic Actuators", Journal of Microelectromechanical Systems, vol. 8 No. 4 Dec. 1999, pp. 497-505, IEEE.

Dagel, et al, "MEMS Adaptive Optics Devices: LDRD No. 02-1385 Summary Report" SAND2002-3954, Dec. 2002, Sandia National Laboratories.

* cited by examiner

*Primary Examiner*—Evelyn A. Lester
(74) *Attorney, Agent, or Firm*—John P. Hohimer

(57) ABSTRACT

A microelectromechanical (MEM) device for redirecting incident light is disclosed. The MEM device utilizes a pair of electrostatic actuators formed one above the other from different stacked and interconnected layers of polysilicon to move or tilt an overlying light-reflective plate (i.e. a mirror) to provide a reflected component of the incident light which can be shifted in phase or propagation angle. The MEM device, which utilizes leveraged bending to provide a relatively-large vertical displacement up to several microns for the light-reflective plate, has applications for forming an electrically-programmable diffraction grating (i.e. a polychromator) or a micromirror array.

29 Claims, 13 Drawing Sheets

MICROELECTROMECHANICAL MIRRORS AND ELECTRICALLY-PROGRAMMABLE DIFFRACTION GRATINGS BASED ON TWO-STAGE ACTUATION

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to microelectromechanical (MEM) devices, and in particular to a MEM light-reflecting device (e.g. a micromirror or an electrically-programmable diffraction grating) that includes two ganged electrostatic actuators to provide an increased range of movement for changing a tilt angle or a phase shift of a reflected light component of an incident light beam.

BACKGROUND OF THE INVENTION

Electrically-programmable microelectromechanical (MEM) diffraction gratings, which have been developed in recent years, can be used for processing light beams for applications including spectroscopy, remote sensing, optical information processing and the routing of optical signals for telecommunications (see e.g. U.S. Pat. Nos. 5,757,536; 5,905,571; and 6,329,738). These MEM diffraction gratings, also termed polychromators, are based on a series of moveable elongate grating elements formed on a substrate, with the grating elements being moveable singly or in sets in a direction normal to the substrate for programming a particular grating pattern within the device to control and tailor the reflection of an incident light beam. The grating elements can be up to one centimeter in length, with a width that is generally about 10–20 µm, and with a vertical range of movement that is a fraction of the wavelength of the incident light for which the device has been designed.

Due to atmospheric transmission considerations, the 8–12 µm wavelength range is optimal for infrared chemical sensing using correlation spectroscopy. In addition, this 8–12 µm spectral band often contains the chemical "fingerprint" bands that help to uniquely determine chemical species of interest. However, the optimal operation of an electrically-programmable MEM diffraction grating in this wavelength range requires that the individual grating elements have a relatively large range of vertical movement equal to one-half wavelength of the incident light (i.e. 4–6 µm vertical movement). This relatively large range of vertical movement is difficult, if not impossible, to achieve with the electrically-programmable MEM diffraction gratings of the prior art.

The present invention represents an improvement over the prior art by providing a MEM apparatus for redirecting incident light that can be used to form an electrically-programmable diffraction grating or micromirror array which can provide an increased range of vertical movement for controlling a phase shift or tilt angle of the reflected light. The increased range of movement is provided by two electrostatic actuators stacked one upon the other, with the two or more electrostatic actuators being operable simultaneously or sequentially.

The present invention also allows an electrically-programmable diffraction grating elements to be formed from a series of unconnected segments arranged end-to-end to accommodate the residual stress associated with a particular MEM fabrication process, and thereby prevent any surface distortion or buckling which might otherwise occur by forming continuous centimeter-long diffraction grating elements.

These and other advantages of the present invention will become evident to those skilled in the art.

SUMMARY OF THE INVENTION

The present invention relates to a microelectromechanical (MEM) apparatus for redirecting incident light. The MEM apparatus comprises a substrate, with a first electrostatic actuator formed on the substrate and comprising a first beam supported above the substrate for movement towards the substrate in response to a first actuation voltage provided to the first electrostatic actuator. A second electrostatic actuator comprises a second beam formed above the first electrostatic actuator and attached thereto, with the second beam being moveable towards the substrate in response to the movement of the first beam, and with the second electrostatic actuator providing a further movement of the second beam towards the substrate in response to a second actuation voltage provided to the second electrostatic actuator. A plate is formed above the second electrostatic actuator and attached thereto, with the plate having a surface for redirecting the incident light to generate a reflected light component having a phase shift or a change in an angle of propagation which depends upon a movement of the plate produced by one or both of the first and second electrostatic actuators. An optional mirror coating can be provided on a major surface of the plate to provide an enhanced reflectivity for the incident light. The substrate can comprise, for example, silicon; and the first and second beams can comprise different layers of polycrystalline silicon.

In certain embodiments of the present invention, the first beam can be supported above the substrate by a single support post. This can be advantageous, for example, to accommodate any residual stress in the first and second beams since the first beam will be attached to the substrate at only a single place as provided by the single support post. In other embodiments of the present invention, the first beam can be supported above the substrate by a plurality of support posts.

In certain embodiments of the present invention, the first and second beams can be arranged side-by-side; whereas in other embodiments of the present invention, the first and second beams can be arranged end-to-end. In a side-by-side arrangement, the first electrostatic actuator can further comprise a third beam supported above the substrate for movement towards the substrate in response to the first actuation voltage, with the second beam being located between the first and third beams and attached thereto. The third beam thus forms a symmetrical balanced side-by-side arrangement of the MEM apparatus, with the second beam generally being attached to the first and third beams near a midpoint of each of the first and third beams when the first and third beams are supported at each end thereof by a plurality of support posts. Alternately, when the first and third beams are each supported by a single support post, the second beam can be attached to the first and third beams near an unsupported end of each of the first and third beams.

The first electrostatic actuator can comprise a first electrode formed on the substrate beneath a portion of the first beam; and the second electrostatic actuator can comprise a second electrode formed on the substrate beneath a portion of the second beam. The first and second actuation voltages provided to the first and second electrostatic actuators, respectively, can be the same or different depending upon how the MEM apparatus is operated. In one mode of operation, the first and second actuation voltages can be provided simultaneously to the two electrostatic actuators with the actuation voltages being identical so that only a single power source is needed. In another mode of operation of the MEM apparatus, the first actuation voltage can be initially applied to the first electrostatic actuator to urge the first and second beams and the plate downwards toward the substrate; and then the second actuation voltage can be applied to the second electrostatic actuator to provide additional downward movement of the second beam and plate while the first actuation voltage is still present. Other modes of operation of the MEM apparatus are possible.

The present invention is further related to a microelectromechanical apparatus for redirecting incident light which comprises a substrate; a plate supported above the substrate and having a light-reflecting upper surface; and a plurality of interconnected beams located beneath the plate to support the plate and to electrostatically move the plate towards the substrate. The plurality of interconnected beams comprises three beams formed substantially parallel to the substrate, with the three beams including a pair of beams formed from one or two layers of polycrystalline silicon, and another beam formed from a different layer of polycrystalline silicon. Each beam has at least one electrode located beneath the beam to urge the beam towards the substrate in response to an actuation voltage provided between the electrode and the beam to move the plate towards the substrate. The substrate can comprise silicon.

In certain embodiments of the present invention, the three beams can be arranged end-to-end; whereas in other embodiments of the present invention, the three beams can be arranged side-by-side. The plate can optionally include a mirror coating formed thereon.

The present invention is also related to a microelectromechanical apparatus for redirecting incident light which comprises a substrate; a plate supported above the substrate and having a light-reflecting upper surface; and a pair of electrostatic actuators formed above the substrate to support the plate for movement thereof. The the pair of electrostatic actuators comprises a first electrostatic actuator which further comprises a pair of spaced-apart beams with each beam being connected at one or both ends thereof to the substrate, and with a first electrode being formed beneath each beam to urge the plate towards the substrate in response to an electrostatic force of attraction produced between that beam and the first electrode therebeneath; and a second electrostatic actuator comprising another beam located above the pair of spaced-apart beams of the first electrostatic actuator and connected thereto and further being connected to the plate, and a pair of second electrodes formed beneath the beam of the second electrostatic actuator to further urge the plate towards the substrate in response another electrostatic force of attraction produced between that beam and at least one of the pair of second electrodes. The substrate can comprise silicon; and each beam can comprise polycrystalline silicon.

The plate can optionally include a mirror coating formed thereon. Movement of the plate can produce either a change in tilt angle of the plate thereby changing an angle of propagation of a reflected portion of the incident light, or the movement of the plate can be performed with the plate remaining substantially coplanar with the substrate to produce a phase shift in the reflected portion of the incident light.

The present invention is further related to a microelectromechanical apparatus for redirecting incident light that comprises a substrate; a plate supported above the substrate and having a light-reflecting upper surface; and a pair of electrostatic actuators attached to the substrate by a single support post to electrostatically move the plate towards the substrate. The pair of electrostatic actuators can comprise a first electrostatic actuator which further comprises a beam attached to the single support post near a midpoint of the beam, and with a pair of first electrodes being formed beneath the beam proximate to the single support post to urge the plate towards the substrate in response to an electrostatic force of attraction produced between the beam and at least one of the first electrodes located therebeneath; and a second electrostatic actuator which further comprises a pair of beams located above the beam of the first electrostatic actuator and attached thereto at one end of each of the pair of beams, with another end of each of the pair of beams being attached to the plate, and with a second electrode being formed beneath each of the pair of beams proximate to the beam of the first electrostatic actuator to further urge the plate towards the substrate in response to another electrostatic force of attraction produced between at least one beam of the pair of beams and the second electrode located therebeneath. The substrate can comprise silicon; and each beam can comprise polycrystalline silicon. The plate can include an optional mirror coating as described previously. Additionally, the apparatus can operate in two different modes of operation either by tilting to change a tilt angle of the plate and thereby change the propagation angle of a reflected portion of the incident light, or by moving substantially coplanar with the substrate to produce a phase shift in the reflected portion of the incident light.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
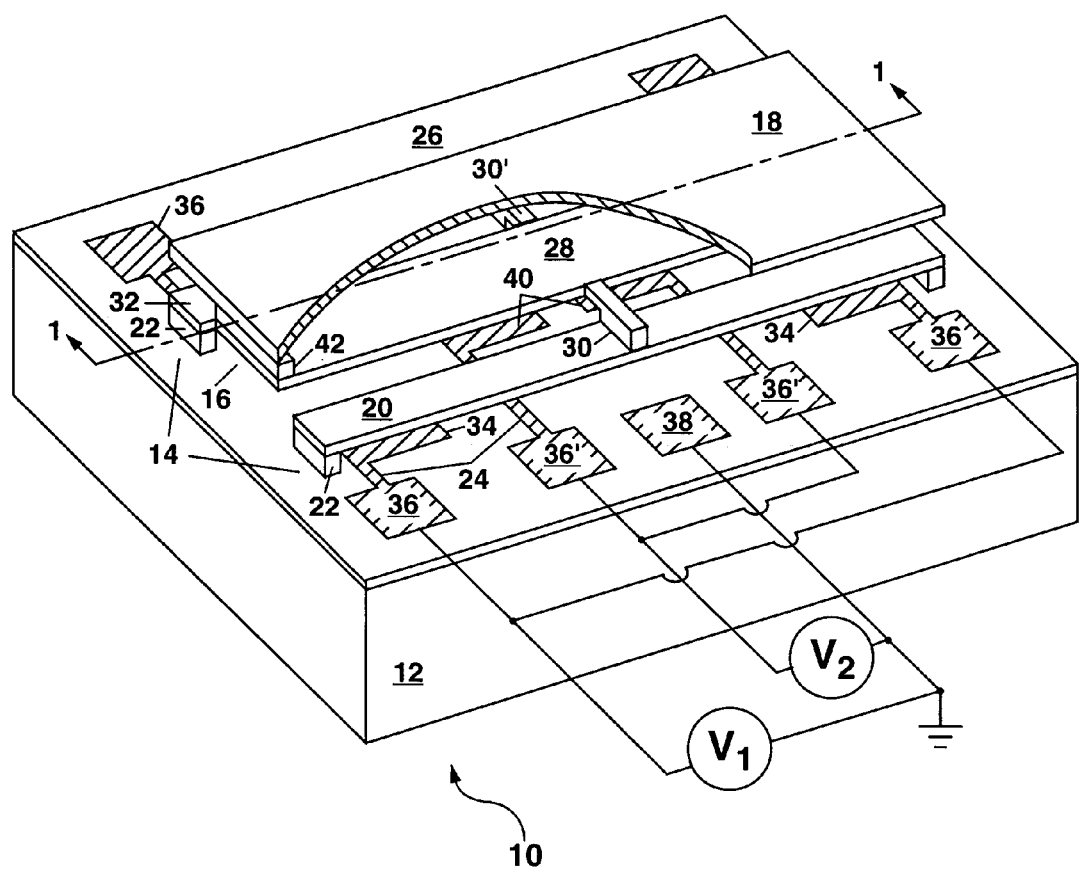
FIG. 1 shows a schematic perspective view of a first embodiment of the MEM apparatus of the present invention with a portion of a moveable plate therein being cutaway to show details of the second beam underlying the plate.

Referring to FIG. 1, there is shown a schematic perspective view of a first embodiment of the MEM apparatus 10 of the present invention. The MEM apparatus 10 (also termed a MEM device) comprises a substrate 12, a first electrostatic actuator 14 formed on the substrate 12, a second electrostatic actuator 16 extending above the first electrostatic actuator 14 and attached thereto, and a plate 18 formed above the second electrostatic actuator 16 and attached thereto. The first electrostatic actuator 14 further comprises a first beam 20 supported above the substrate 12 on a plurality of support posts 22 for movement in a direction substantially normal to the substrate 12 in response to a first actuation voltage $V_1$ which can be provided to the first electrostatic actuator 14 through wiring 24 formed over an electrically-insulating layer 26 on the substrate 12.

In FIG. 1, the second electrostatic actuator 16 comprises a second beam 28 which is supported above and to one side of the first beam 20 and attached to the first beam 20 near a midpoint of each of the first and second beams 20 and 28, respectively, by a connecting member 30. The first and second beams, 20 and 28, are of substantially the same length in the embodiment of the present invention in FIG. 1, and can be, for example, up to about 400–500 µm long, with the exact length depending upon a residual stress in the beams 20 and 28. In the MEM apparatus of FIG. 1, the first electrostatic actuator 14 also includes a third beam 32 formed identically to the first beam 20 but with an oppositely-directed connecting member 30' to support a side of the second beam 28 opposite the first beam 20.

The first electrostatic actuator 14 further comprises a set of electrodes 34 underlying each beam 20 and 32, with the individual electrodes 34 in the set being located proximate to the support posts 22 and beneath a portion of the beams 20 and 32, and with the electrodes 34 further being electrically connected through the wiring 24 to one or more electrical contact pads 36 (i.e. bond or probe pads). An opposing set of electrodes (not shown) can be formed on an underside of the beams 20 and 32, or alternately the beams 20 and 32 and the support posts 22 can comprise polycrystalline silicon (also termed polysilicon) that is doped (e.g. with phosphorous) for electrical conductivity. The beams 20 and 32 can be electrically grounded by being connected through the substrate 12 or through wiring (not shown) on the substrate to one or more ground contact pads 38. The second electrostatic actuator 16 further comprises another set of electrodes 40 underlying a portion of the second beam 28, with the electrodes 40 being located proximate to the midpoint of the second beam 28 and connected through wiring 24 to one or more contact pads 36' as shown in FIG. 1.

The exact length of the electrodes 34 and 40 can be selected so that the beams 20, 32 and 28 do not come into contact with the electrodes 34 when the beams 20, 32 and 28 are bent sufficiently so as to contact the electrically-insulating layer 26 on the substrate 12. Generally, the length of the electrodes 34 will up to one-quarter or one-third of the length of the beams 20, 32 and 28. In some embodiments of the present invention, an insulating layer (not shown) can be provided over the electrodes 34 and 40 to allow the electrodes 34 and 40 to extend over a longer length without the danger of producing an electrical short circuit by contact with the beams 20, 32 and 28, or alternately a plurality of stops (not shown) can be provided on the substrate 12 to prevent contact of the beams 20, 32 and 28 with the electrodes 34 and 40.

The MEM apparatus 10 provides a controlled downward movement of the plate 18 in response to the first actuation voltage $V_1$ provided to the first electrostatic actuator 14, and also in response to a second actuation voltage $V_2$ provided to the second electrostatic actuator 16. Operation of the device 10 of FIG. 1 can be understood with reference to FIGS. 2A–2C which show schematic cross-section views of the MEM apparatus 10 along the section line 1—1 in FIG. 1.

Figure 2A:
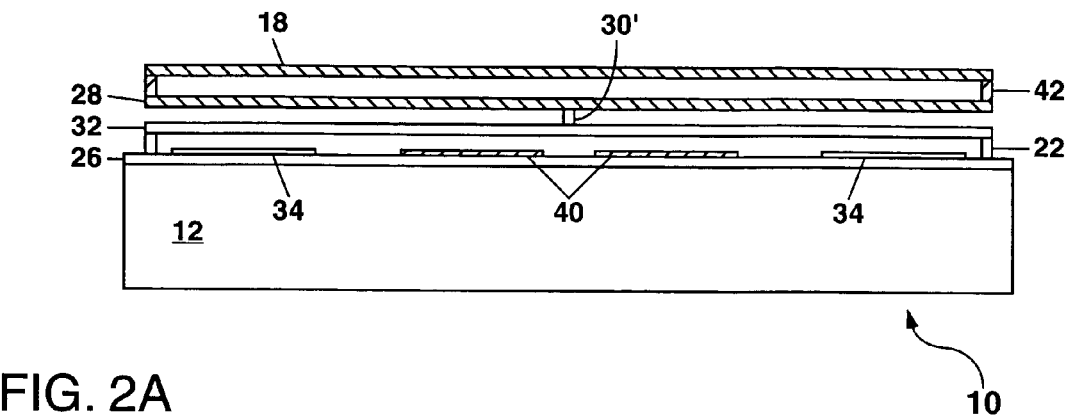
FIG. 2A shows a schematic cross-section view of the first embodiment of the MEM apparatus of the present invention along the section line 1—1 in FIG. 1, with the MEM apparatus being in an as-fabricated position.

In FIG. 2A, the MEM apparatus 10 is shown in an initial as-fabricated position with all voltages (i.e. $V_1$ and $V_2$) removed. In this initial position, the various beams 20, 28 and 32 and the plate 18 are all substantially coplanar with the substrate 12, with spacings between these elements being determined by the support posts 22, the connecting members 30 and 30' and a pair of spacers 42 attaching each end of the second beam 28 to the plate 18.

Figure 2B:
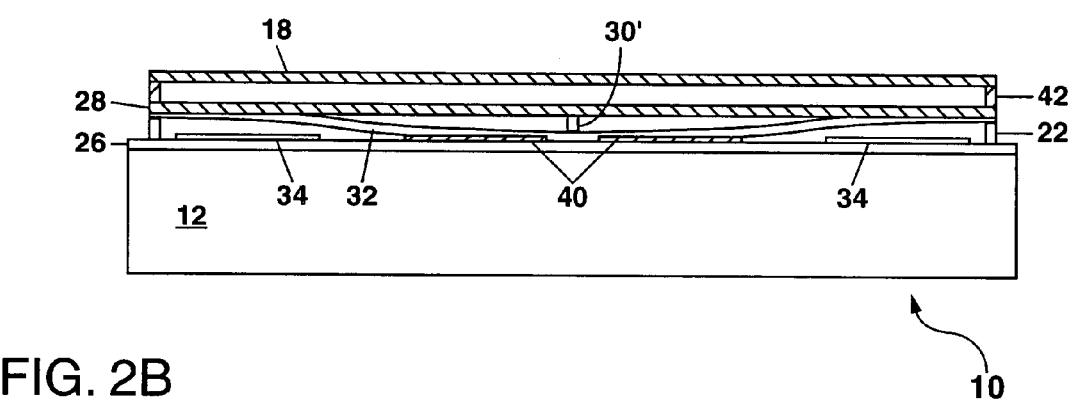
FIG. 2B illustrates a first stage of operation of the MEM apparatus of FIG. 2A after a first actuation voltage $V_1$ has been applied to the first electrostatic actuator to urge the plate and supporting elements downward towards the substrate.

In FIG. 2B, the first actuation voltage $V_1$ is applied to the first electrostatic actuator 14 producing an electrostatic force of attraction that urges the first and third beams 20 and 32 downward towards the substrate 12, with an exact downward displacement of these beams 20 and 32 depending upon a magnitude of the voltage $V_1$, the size and placement of the electrodes 34 and a spacing between the beams 20 and 32 and the underlying electrodes 34. The first actuation voltage $V_1$ can be, for example, up to 50 volts when the beams 20 and 32 are about 2 µm away from the underlying electrodes 34. By locating the electrodes 34 as shown in FIG. 1 and FIGS. 2A–2C, a leveraged bending action can be generated which bends the midpoint of the first and third beams 20 and 32, respectively, downward towards the substrate 12 and even into contact with the substrate 12 without short circuiting the beams 20 and 32 and the electrodes 34 and without encountering any electrostatic-structural instability. One or more dimples (not shown) can be formed on an underside of the beams 20 and 32 proximate to a midpoint thereof to permit contact of the beams 20 and 32 with the substrate 12 while preventing adhesion (i.e. stiction).

The use of leveraged bending as shown in FIG. 2B is advantageous since the extent of downward movement of the beams 20 and 32 of the first electrostatic actuator 14 can be made as large as the separation of these beams 20 and 32 from the substrate 12 (i.e. equal to the thickness of a sacrificial layer separating the first and third beams 20 and 32 from the substrate 12 during fabrication of the MEM apparatus 10 by surface micromachining as will be described in detail hereinafter). The second beam 28 and the plate 18, which are attached to the first and third beams 20 and 32, respectively, through the connecting members 30 and 30', move downward by the same extent as the first and third beams 20 and 32 in FIG. 2B. This extent of movement can be, for example, 2 µm.

Figure 2C:
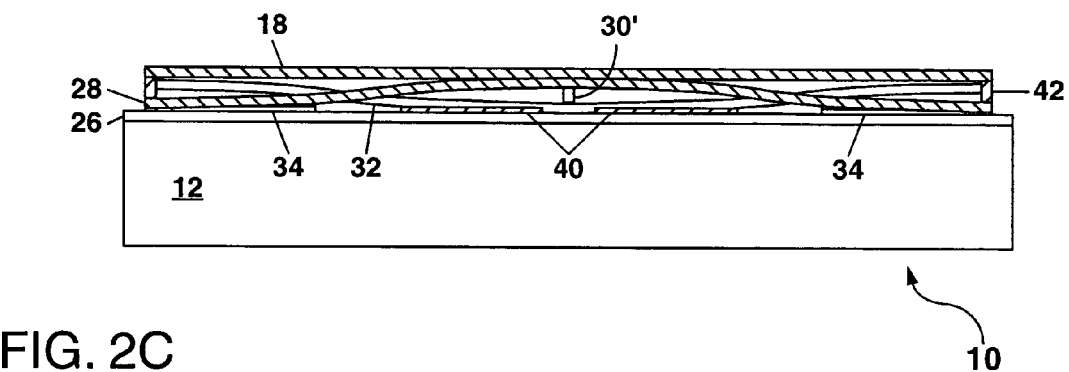
FIG. 2C illustrates a second stage of operation of the MEM apparatus of FIGS. 2A and 2B after a second actuation voltage $V_2$ has been applied to the second electrostatic actuator to further urge the plate and supporting elements downwards towards the substrate.

In FIG. 2C, a further downward extent of movement of the plate 18 can be provided in the MEM apparatus 10 of the present invention by applying the second actuation voltage $V_2$ to the second electrostatic actuator 16 while the first actuation voltage $V_1$ is still present. Increasing the voltage $V_2$ between the electrodes 40 and the second beam 28 produces an electrostatic force of attraction that bends the ends of the second beam 28 downward by an extent that depends upon the magnitude of the second actuation voltage $V_2$ (see FIG. 2C). This also moves the plate 18 downward by the same extent. One or more dimples (not shown) can be optionally formed beneath each end of the second beam 28 to permit contact with the substrate 12 while minimizing stiction. The extent of movement provided by the second electrostatic actuator 16 can be larger than that provided by the first electrostatic actuator 14 since the ends of the second beam 28 can be urged into contact with the substrate 12. In the event that the downward extent of movement of the second electrostatic actuator 16 is limited by contact of the plate 18 with the second beam 28, one or more openings (not shown) can be provided in the plate 18 at the locations of such contact to allow a portion of the second beam 28 to protrude at least partway through the thickness of the plate 18.

Reducing either or both of the voltages $V_1$ and $V_2$ will move the plate 18 upwards away from the substrate 12 due to a spring action provided by the bent beams 20, 32 and 28. Thus, a control of the actuation voltages $V_1$ and $V_2$ permits a vertical orientation of the plate 18 with respect to the substrate 12 to be precisely controlled and varied over a displacement of up to several microns, with the exact displacement depending upon the thickness of the various elements forming the structure of the MEM apparatus 10, and in particular the height of the second beam 28 above the substrate 12.

Although the action of the two electrostatic actuators 14 and 16 in moving the plate 18 downward has been described in terms of a sequential application of the voltages $V_1$ and $V_2$, those skilled in the art will understand that the voltages $V_1$ and $V_2$ can be applied simultaneously to urge all of the beams 20, 28 and 32 downward together. In this case, the voltages $V_1$ and $V_2$ can be provided separately from two sources as shown in FIG. 1. Alternately, the voltages $V_1$ and $V_2$ can be made identical to each other so that a single power source (e.g. a computer-controlled voltage source) can be used to operate the MEM apparatus 10.

The MEM apparatus 10 of FIG. 1 can be formed by surface micromachining processes as will now be described with reference to FIGS. 3A–3I which show schematic cross-section views of the apparatus 10 along the section lines 1—1 in FIG. 1. The surface micromachining processes are based on conventional integrated circuit (IC) processing steps, including material deposition, photolithography, masking, etching, mask stripping, and cleaning. A relatively large number of individual process steps can be used to form the completed structure of the MEM apparatus 10 based on repeated deposition and patterning of alternating layers of polycrystalline silicon (also termed polysilicon) and a sacrificial material (e.g. silicon dioxide or a silicate glass), with the MEM apparatus 10 being built up layer by layer.

The term "patterning" as used herein refers to a sequence of well-known processing steps including applying a photoresist to the substrate 12, prebaking the photoresist, aligning the substrate 12 with a photomask, exposing the photoresist through the photomask, developing the photoresist, baking the wafer, etching away the surfaces not protected by the photoresist, and stripping the protected areas of the photoresist so that further processing can take place. The term "patterning" can further include the formation of a hard mask (e.g. comprising about 500 nanometers of a silicate glass deposited from the decomposition of tetraethylortho silicate, also termed TEOS, by low-pressure chemical vapor deposition at about 750° C. and densified by a high temperature processing) overlying a polysilicon or sacrificial material layer in preparation for defining features into the layer by etching.

Figure 3A:
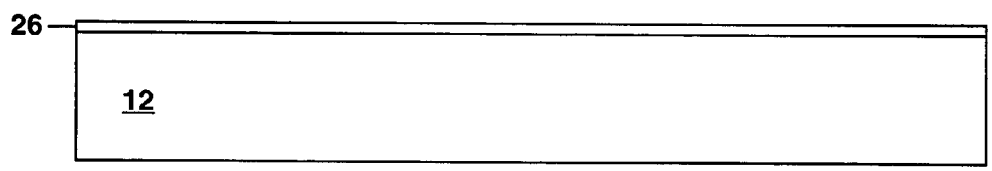
FIGS. 3A–3I schematically illustrate in cross-section view the buildup of the structure of the MEM apparatus of FIG. 1 using a series of surface micromachining process steps.

In FIG. 3A, a substrate 12 is provided which preferably comprises silicon, and can be either a monocrystalline silicon substrate or a silicon-on-insulator substrate. The substrate 12 can be initially prepared for fabrication of the MEM apparatus 10 as shown in FIG. 3A by blanketing the substrate with an electrically-insulating layer 26 which comprises a layer of thermal oxide (about 600 nanometers thick) formed by a conventional wet oxidation process at an elevated temperature (e.g. 1050° C. for about 1.5 hours) and an overlying layer of low-stress silicon nitride (e.g. 800 nanometers thick) which can be deposited using low-pressure chemical vapor deposition (LPCVD) at about 850° C. The electrically-insulating layer 26 provides electrical isolation from the substrate 12 for a subsequently-deposited first polysilicon layer (termed Poly-0). One or more vias can be photolithographically defined and etched through the thermal oxide and silicon nitride layers so that electrical connections between the Poly-0 layer and the substrate 12 can be formed (e.g. at the location of the support posts 22 and the ground contact pad 38 in FIG. 1).

Figure 3B:
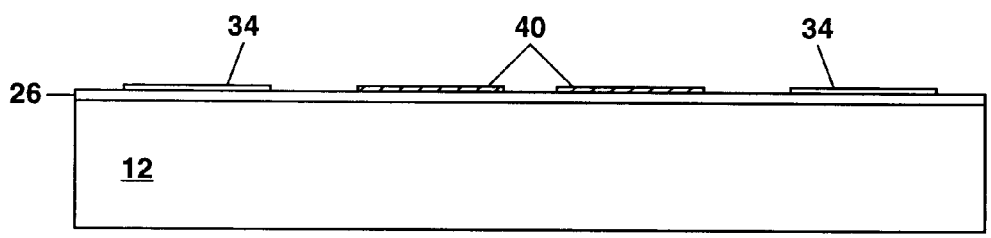

The Poly-0 layer, which can be about 0.3 µm thick, is deposited by LPCVD at about 580° C. to blanket the substrate 12 and the electrically-insulating layer 26. Phosphorous doping can be used to make the Poly-0 layer and subsequently-deposited polysilicon layers electrically conductive as needed. The Poly-0 layer can then be patterned as shown in FIG. 3B by photolithographic definition and etching to form the various electrodes 34 and 40, the wiring 24, the contact pads 36 and 36', the ground contact pad 38, and to begin to build up the support posts 22. After deposition and patterning, the Poly-0 layer can be annealed at a high temperature (e.g. at about 1100° C. for three hours) to reduce any residual stress therein. A separate annealing step can be performed after deposition and patterning of each subsequently-deposited polysilicon layer.

Figure 3C:
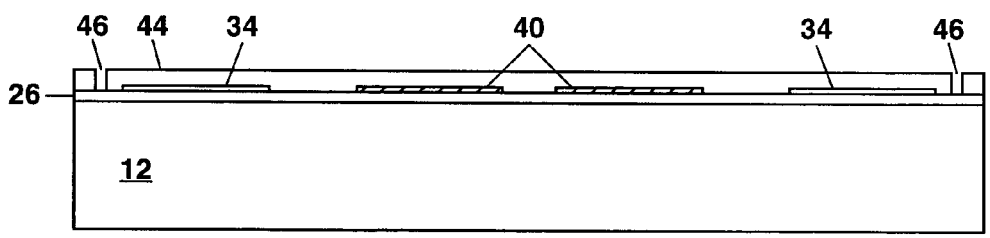

In FIG. 3C, a first layer of a sacrificial material 44 can be blanket deposited to cover the Poly-0 layer and the substrate 12 and patterned to form a plurality of openings 46 through the sacrificial material 44 at the locations of the support posts 22. The first layer of the sacrificial material 44, which can be, for example, 2-μm thick, can comprise silicon dioxide ($SiO_2$) or a silicate glass (e.g. a plasma-enhanced CVD oxide, also termed PECVD oxide; or a silicate glass deposited from decomposition of tetraethylortho silicate, also termed TEOS, by LPCVD at about 750° C. and densified by a high temperature processing).

After deposition, each layer of the sacrificial material 44 described herein can be planarized, as needed, by chemical-mechanical polishing (CMP) as disclosed in U.S. Pat. No. 5,804,084 to Nasby et al, which is incorporated herein by reference. The use of CMP permits the layer thickness of each layer of the sacrificial material 44 to be precisely adjusted, maintains a planar topography during buildup of the structure of the MEM apparatus 10, and eliminates any stringers which might otherwise occur as a result of anisotropic etching (e.g. reactive ion etching) which is used to define the shapes of the various elements in the MEM apparatus 10 and to form the openings 46 through the sacrificial material 44.

Figure 3D:
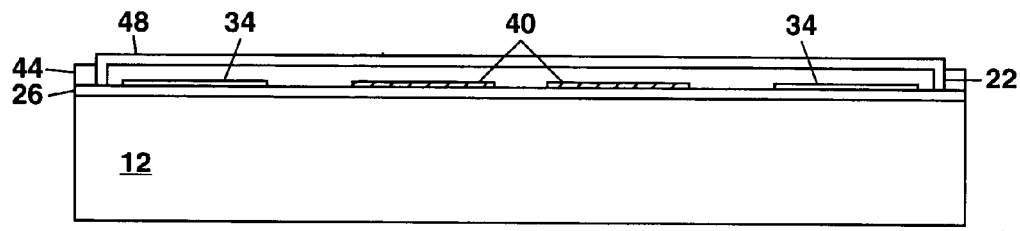

In FIG. 3D, a second layer 48 of polysilicon is blanket deposited over the first layer of the sacrificial material 44 using one or two deposition steps. The second layer 48 of polysilicon can be about 2.5-μm thick and can comprise, for example, a Poly-1 layer about 1-μm thick and an overlying Poly-2 layer about 1.5-μm thick with the two layers being laminated together (denoted herein as a Poly-1+Poly-2 layer 48). In some preferred embodiments of the present invention, a thin (e.g. 0.3-μm thick) layer of the sacrificial material 44 can be encased between the Poly-1 and Poly-2 layers. This can be useful to provide a residual tensile stress to balance out a residual compressive stress in the Poly-1 and Poly-2 layers. In FIG. 3D, the second layer 48 of polysilicon is deposited in the openings 46 to further build up the support posts 22, and can be patterned after deposition to form the first beam 20 and the third beam 32.

Figure 3E:
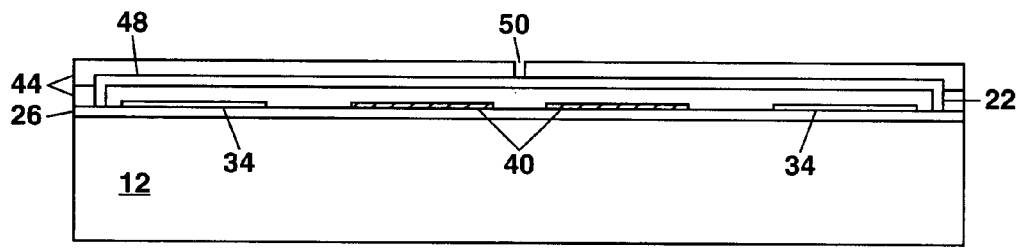

In FIG. 3E, another layer of the sacrificial material 44 can be blanket deposited over the substrate 12 and planarized by CMP This layer of the sacrificial material 44 can be, for example, 2 μm thick. Openings 50 can be etched (e.g. by reactive ion etching) through this layer of the sacrificial material 44 at the locations where the connecting members 30 and 30' are to be formed.

Figure 3F:
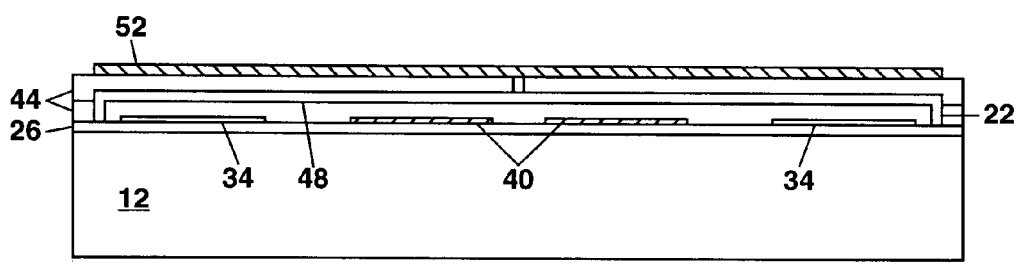

In FIG. 3F, another layer 52 of polysilicon (denoted as the Poly-3 layer) can be blanket deposited over the substrate 12 and into the openings 50. The Poly-3 layer 52 can then be patterned to form the second beam 28 and the connecting members 30 and 30'. The Poly-3 layer 52 can be, for example, 2.25 μm thick.

Figure 3G:
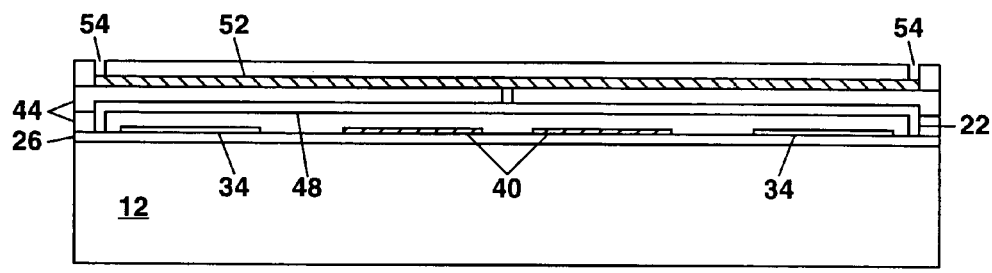

In FIG. 3G, yet another layer of the sacrificial material 44 can be blanket deposited over the substrate 12 and planarized by CMP. This layer of the sacrificial material can be, for example, 2 μm thick and is patterned to form openings 54 wherein the spacers 42 are to be formed by a subsequently-deposited Poly-4 layer.

Figure 3H:
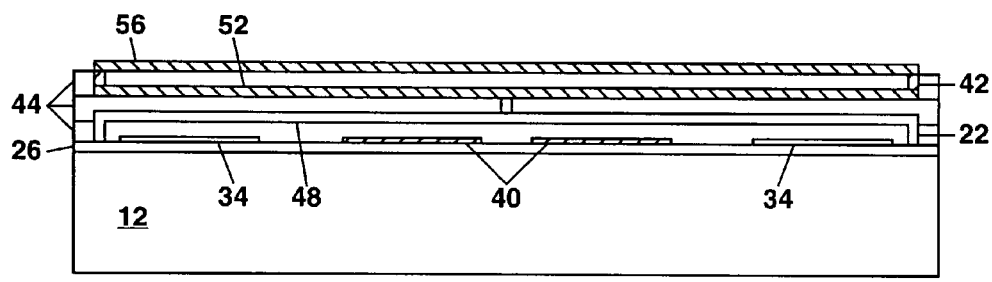

In FIG. 3H, yet another layer 56 of polysilicon (denoted as the Poly-4 layer) can be blanket deposited over the substrate 12 to fill in the openings 54 and thereby form the spacers 42. The Poly-4 layer 56 can also be patterned to form the plate 18.

Figure 3I:
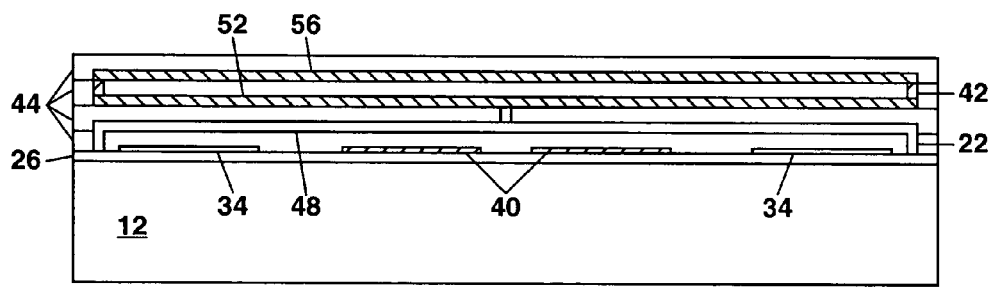

In FIG. 3I, a final layer of the sacrificial material 44 can be blanket deposited over the substrate 12 to encapsulate the Poly-4 layer 56 in preparation for a final high-temperature annealing step (e.g. at 1100° C. for three hours) to minimize any residual stress in the various polysilicon layers. This layer of sacrificial material 44 need not be planarized.

After the final annealing step, the MEM apparatus 10 can be released for operation by selectively etching away the various layers of the sacrificial material 44 using a selective etchant comprising hydrofluoric acid (HF) that does not chemically attack the polysilicon layers. This etching step can be performed over a period of several hours or overnight.

The completed MEM apparatus 10 after removal of the sacrificial layers is shown in FIGS. 1 and 2A. Although not shown, the various contact pads 36, 36' and 38 can be metallized using a deposited layer of a metal such as tungsten or aluminum or an alloy thereof (e.g. an AlCu alloy). This can be done, for example, prior to releasing the MEM apparatus 10 by anisotropically etching (e.g. using reactive ion etching) down through the various layers of the sacrificial material 44 at the locations of the contact pads 36, 36' and 38 and depositing the metal.

A plurality of the MEM devices 10 of FIG. 1 can be arranged on a common substrate 12 in a one-dimensional or a two-dimensional array. The exact size and arrangement of the MEM devices 10 and whether the devices 10 are operated individually or in sets can allow the formation of different types of optical devices for redirecting incident light beams.

Figure 4:
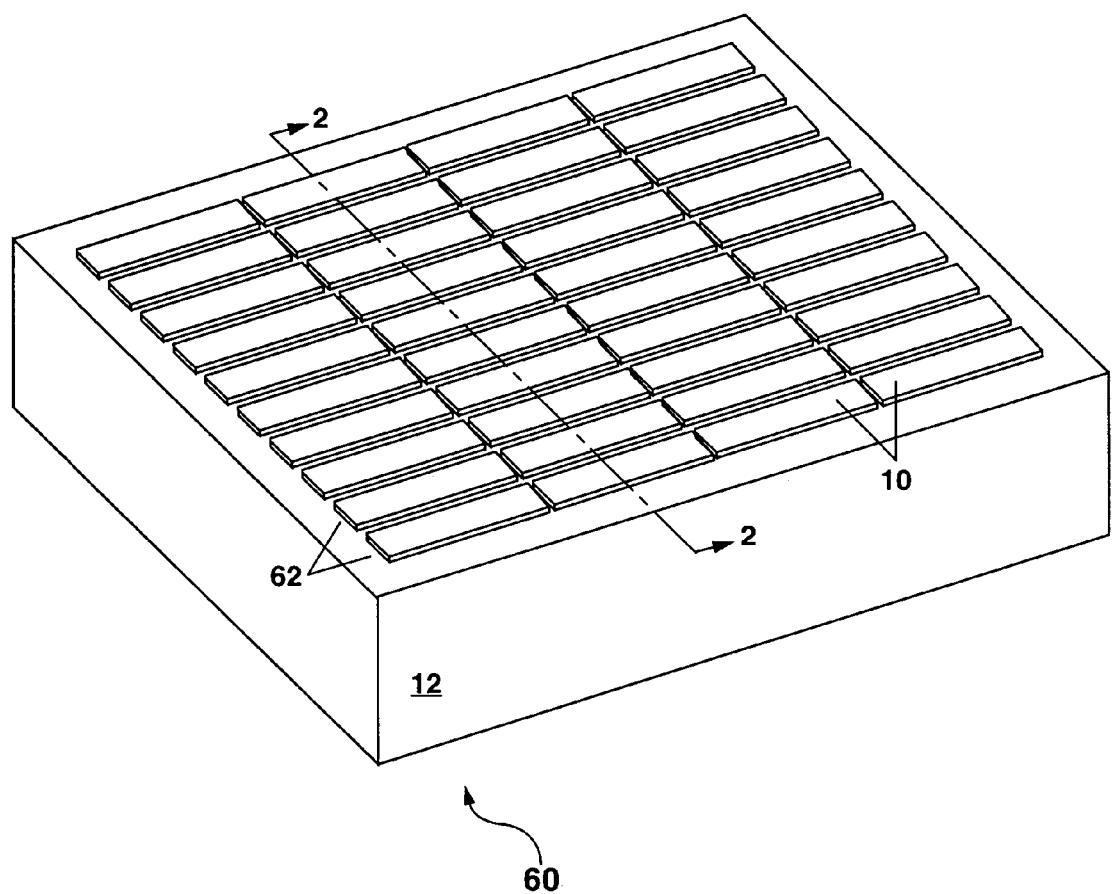
FIG. 4 shows a programmable diffraction grating (also termed a polychromator) formed according to the present invention using a two-dimensional array of MEM devices from FIG. 1, with each row of the MEM devices being operated in unison to form a moveable grating element.

As an example, FIG. 4 shows in schematic perspective view an electrically-programmable diffraction grating 60 (also termed a polychromator) comprising a plurality of individually-addressable grating elements 62, with each grating element 62 being formed from a plurality of MEM devices 10 arranged end-to-end and operated in unison to provide grating elements 62 which can be up to one centimeter long or more. The individual MEM devices 10 can have lateral dimensions of, for example, 5–20 μm wide and 400–500 μm long. An air gap between adjacent of the end-to-end MEM devices 10 can be, for example, 1 μm; and a spacing between adjacent grating elements 62 can be, for example, 1–2 μm. Operation of the plurality of MEM devices 10 forming each grating elements 62 in unison can be performed by wiring the electrodes 36, 36' and 40 in parallel so that the actuation voltages $V_1$ and $V_2$ will move all of the plates 18 in each grating element 62 together to maintain the coplanarity of the various plates 18 making up that grating element 62.

Figure 5A:
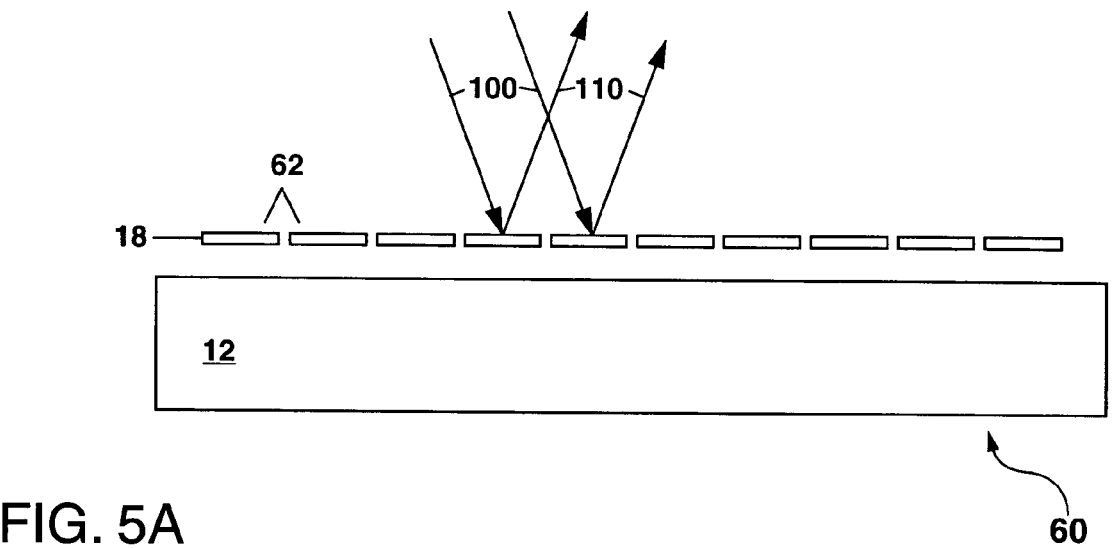
FIGS. 5A and 5B illustrate operation of the polychromator in FIG. 4.
Figure 5B:
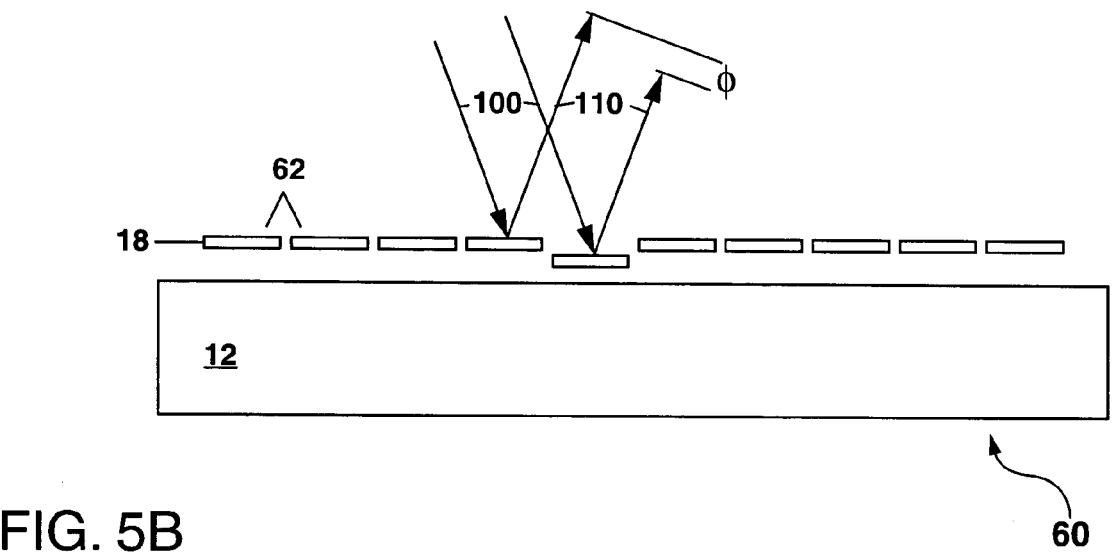

Operation of the polychromator 60 can be understood with reference to FIGS. 5A and 5B which show schematic cross-section views along the section line 2—2 in FIG. 4. In FIGS. 5A and 5B, only the plates 18 are shown with the underlying actuators 14 and 16 being omitted since the plates 18 are responsible for acting upon incident light 100 to produce a reflected light component 110 having a phase shift φ due to the relative positions of one or more of the plates 18. In FIG. 5A, with no voltages applied, all of the grating elements 62 are coplanar so that the reflected light components 110 from adjacent grating elements 62 are in-phase, and the polychromator 60 simply acts as a reflecting mirror. In FIG. 5B, changing a vertical position of one or more of the grating elements 62 by application of the voltages $V_1$ and $V_2$ to move the plates 18 of those grating elements 62 downward produces a phase shift φ for the reflected light components 110 for those grating elements 62. The phase shift φ between each pair of adjacent grating elements 62 can thus be arbitrarily selected by adjusting the relative positions of the various grating elements 62 using the voltages $V_1$ and $V_2$. In an actual polychromator 60, there can be up to hundreds or thousands of individual grating elements 62, with each grating element 62 preferably being tunable over a vertical distance of up to one-half the wavelength (λ/2) of the incident light 100. The polychromator 60 has applications for use in optical switching, optical modulation and correlation spectroscopy.

Figure 6:
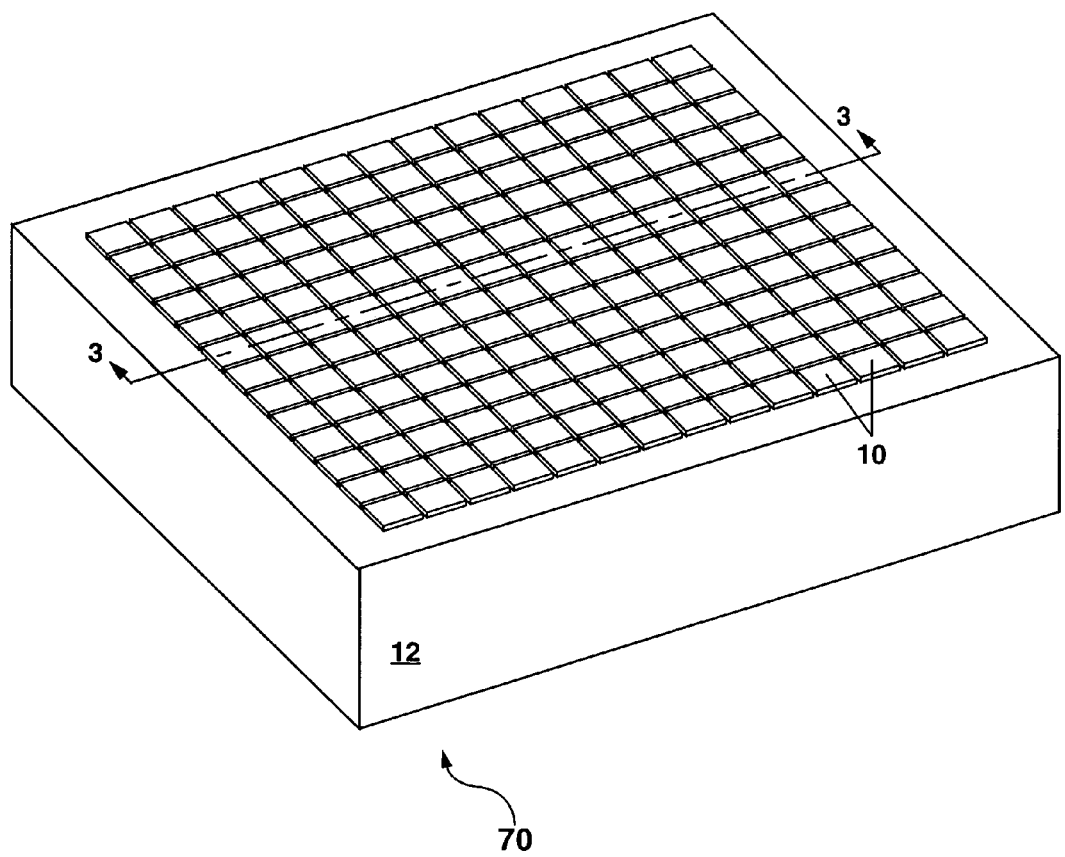
FIG. 6 shows a micromirror array formed according to the present invention from a two-dimensional array of independently controllable MEM devices as shown in FIG. 1.

The present invention can also be used to form a micromirror array 70 wherein a plurality of individual MEM devices 10 are arrayed on a common substrate 12 as shown by way of example in FIG. 6, with each MEM device 10 being wired for independent addressability to control a phase shift φ or tilt angle of any incident light 100 that is to be reflected from particular MEM devices 10. By independently addressing each MEM device 10, the various MEM devices 10 in the micromirror array 70 can move relative to each other as needed. The individual MEM devices 10 can be square, rectangular, hexagonal, or of any arbitrary shape, and can have lateral dimensions of, for example, up to 100–200 μm.

Each MEM device 10 in the micromirror array 70 can be independently programmed to provide a predetermined phase shift φ or tilt angle for a reflected light component 110 of the incident light 100. The phase shift φ can be altered as described previously with reference to FIGS. 2A–2C and 5A–5B.

Figure 7A:
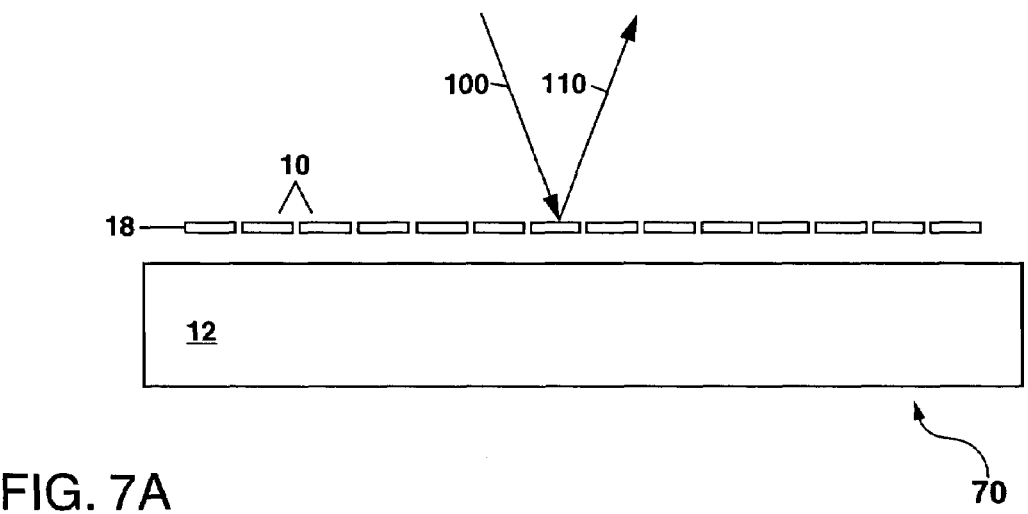
FIGS. 7A and 7B illustrate tilting of one of the MEM devices in the array of FIG. 6.
Figure 7B:
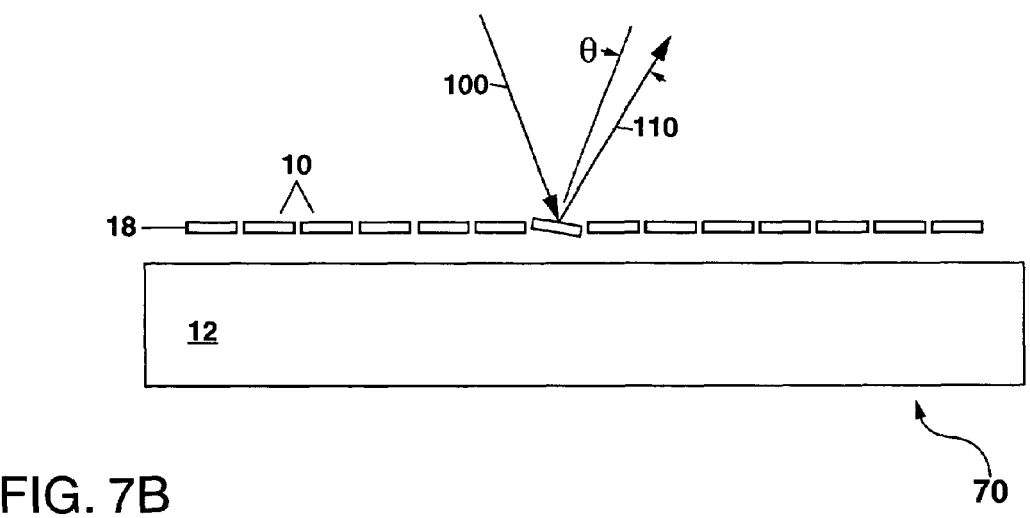

Tilting of the individual MEM devices 10 in a micromirror array 70 along an axis between the connecting members 30 and 30' is illustrated in FIGS. 7A and 7B which show schematic cross-section views along the section line 3—3 in FIG. 6. FIG. 7A shows the micromirror array 70 in an as-fabricated state without any voltages $V_1$ and $V_2$ being applied and with each MEM device 10 having a plate 18 that is substantially coplanar with the substrate 12 and with the plates 18 of all the other MEM devices 10 in the micromirror array 70.

In FIG. 7B, one of the MEM devices 10 has been tilted to produce a change in angle θ for a reflected light component 110 of the incident light 100 with the change in angle θ being equal to the tilt angle of the plate 18 of that MEM device 10. Tilting of one or more of the MEM devices 10 in FIGS. 1 and 6 can be achieved by arranging the wiring 24 so that the electrodes 34 and 40 on one side of the connecting members 30 and 30' can be activated independently of the electrodes 34 and 40 on the other side of the connecting members 30 and 30'. As a result, application of the first actuation voltage $V_1$ can be used to bend one side of the beams 20 and 32 downward to begin to tilt the second beam 28 and plate 18. The second actuation voltage $V_2$ can then be applied to further tilt the same side of the second beam 28 and plate 18 downward towards the substrate 12, with the connecting members 30 and 30' acting as torsional hinges, until a maximum tilt angle is reached when the end of the second beam 28 on this side contacts the substrate 12.

With the various polysilicon layers having the thicknesses and separations as described with reference to FIGS. 3A–3I, each end of the second beam 28 can be tilted downward by a distance of up to 6.5 μm thereby providing a maximum tilt angle of ±7 degrees for a MEM device 10 having a 100-μm-long second beam 28. By reducing the length of the second beam 28 or by increasing the thicknesses of the various layers used to build up the structure of the MEM device 10, the tilt angle can be increased further.

Tilting of the individual MEM devices 10 along an axis orthogonal to that described above can also be accomplished by electrostatically moving one of the beams 20 or 32 downward while the other beam 32 or 20 is left in an as-fabricated position. This can be done, for example, by providing the first actuation voltage $V_1$ to the electrodes 34 underneath the first beam 20 while electrically grounding the electrodes 34 underneath the third beam 32. The micromirror array 70 of FIG. 6 has applications for use in projection displays, adaptive optics, optical switching, and wavefront correction and measurement.

Figure 8:
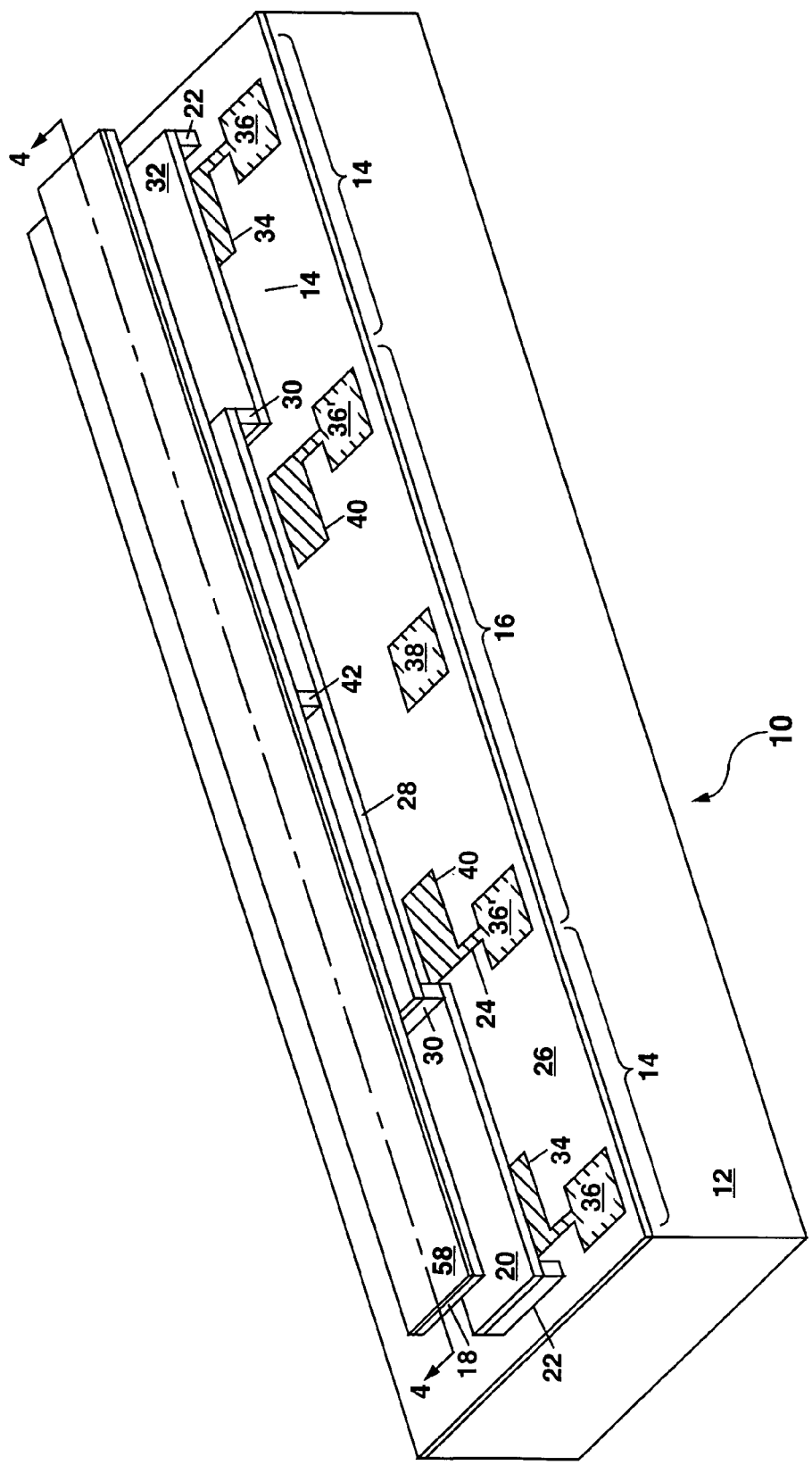
FIG. 8 shows a schematic perspective view of a second embodiment of the MEM apparatus of the present invention.

FIG. 8 shows a second embodiment of the MEM apparatus 10 of the present invention. In this case, the various beams 20, 28 and 32 of the two electrostatic actuators 14 and 16 are arranged end-to-end (i.e. in-line) with each other. The first electrostatic actuator 14 comprises the first beam 20 and the third beam 32 and a pair of underlying electrodes 36; and the second electrostatic actuator 16 comprises the second beam 28 and a pair of underlying electrodes 36'. The first and third beams 20 and 32, respectively, are cantilevered over the substrate 12 by support posts 22, with the second beam 28 and a pair of connecting members 30 forming a bridge between an unsupported end of each of the beams 20 and 32. A single spacer 42 can be used to connect the plate 18 to a midpoint of the second beam 28. The plate 18 in the second embodiment of the present invention in FIG. 8 can be, for example, 2–20 μm wide and up to 1 millimeter long, with the exact length of the plate 18 depending upon a level of residual stress in the various deposited layers used to build up the structure of the MEM apparatus 10. Although the beams 20, 28 and 32 are shown about the same width as the plate 18 in FIG. 8, in other embodiments of the present inventions the beams 20, 28 and 32 can be made narrower than the plate 18.

In FIG. 8, an upper surface of the plate 18 can be coated with a light-reflective material (e.g. a metal or dielectric coating as known to the art) to form a mirror coating 58 which provides an enhanced reflectivity for light. A mirror coating 58 can be formed from a layer of a deposited metal such as aluminum or gold about 200 nanometers thick; or alternately the mirror coating 58 can comprise a dielectric coating formed from a plurality of alternating layers of dielectric materials having different indices of refraction, with each layer being one-quarter wavelength thick for a wavelength of interest.

Figure 9A:
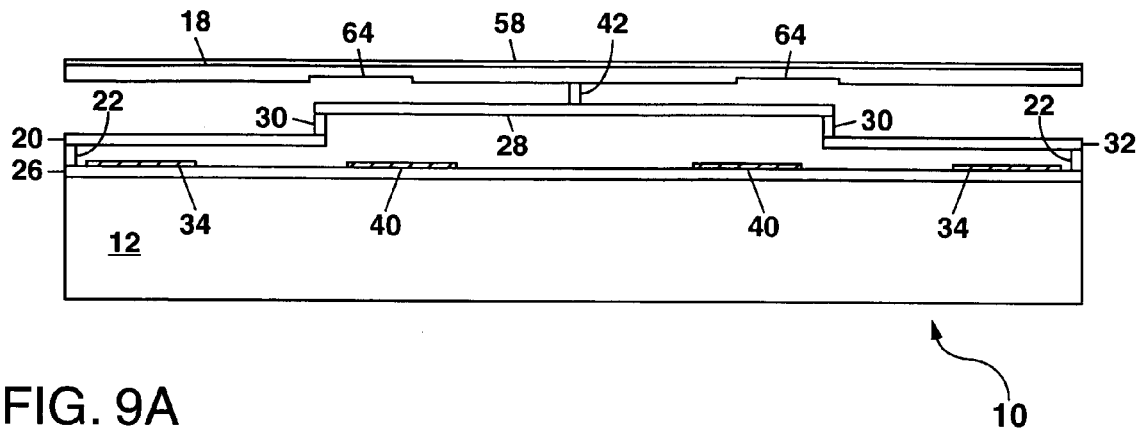
FIGS. 9A–9C show schematic cross-section views of the MEM apparatus of FIG. 8 along the section line 4—4 to illustrate operation of this second embodiment of the present invention.
Figure 9B:
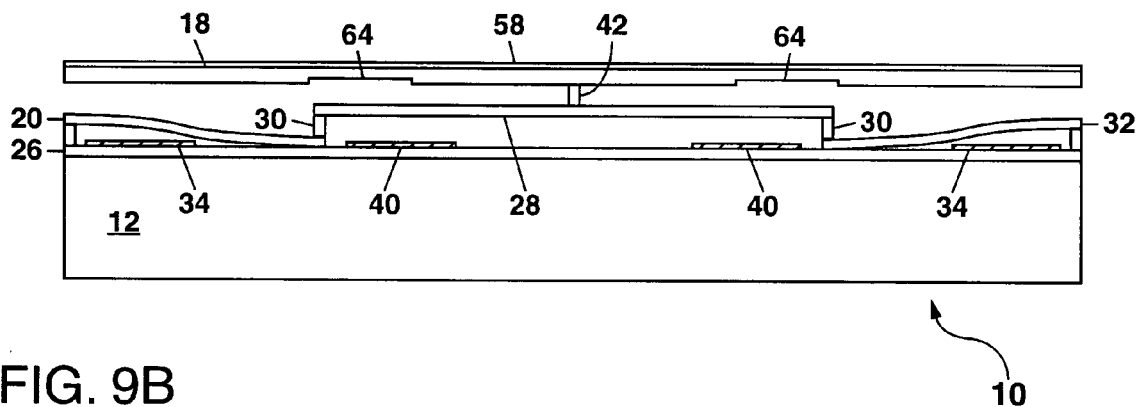
Figure 9C:
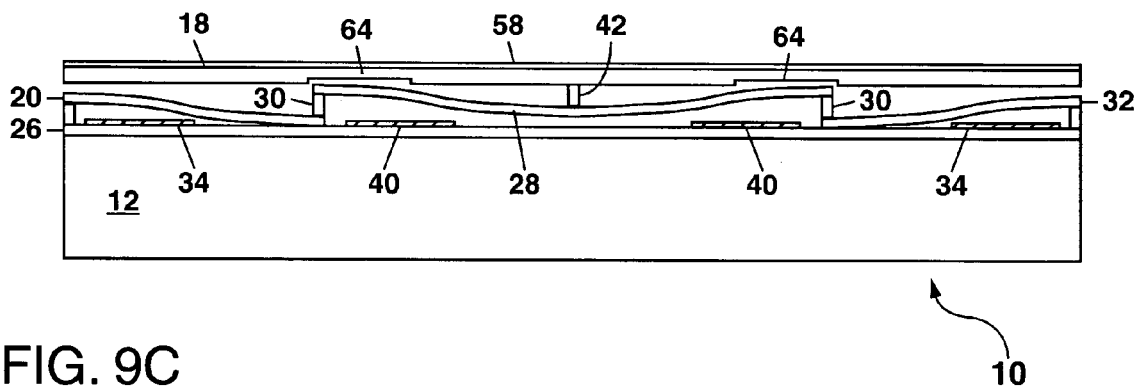

Operation of the second embodiment of the MEM apparatus 10 can be understood with reference to FIGS. 9A–9C which show schematic cross-section views along the section line 4—4 in FIG. 8. FIG. 9A shows the second embodiment of the MEM apparatus 10 in an as-fabricated position without any voltages being applied. In FIG. 9B, the first actuation voltage $V_1$ can be applied between the first beam 20 and an underlying electrode 34 and between the third beam 32 and another underlying electrode 34 via the contact pads 36 and the ground contact pad 38. This produces an electrostatic force of attraction that urges the first and third beams 20 and 32 downward towards the substrate by an amount which depends upon the magnitude of the first actuation voltage $V_1$, thereby pulling the attached second beam 28 and plate 18 downward.

With the first actuation voltage $V_1$ still in place, a second actuation voltage $V_2$ can be applied between the second beam 28 and the electrodes 40 via the contact pads 36' and the ground contact pad 38. This produces a further electrostatic force of attraction that acts on the second beam 28 to urge it downward by an amount which depends upon the magnitude of the second actuation voltage $V_2$. In this way the extend of downward movement of the plate 18, which is attached to the second beam 28, can be controlled and varied over a range of up to several microns, and preferably by an amount up to one-half the wavelength (λ/2) of the incident light 100 with which the MEM device 10 is to be used. Although movement of the plate 18 has been described above by first applying $V_1$ and then applying $V_2$, the MEM device 10 can also be operated by simultaneously applying $V_1$ and $V_2$, or alternately by using a single actuation voltage which is simultaneously applied to the two electrostatic actuators 14 and 16.

To provide for movement of the plate 18 beyond a point where it would come into contact with the second beam 28, a plurality of openings 64 can be optionally formed on an underside of the plate 18 as shown in FIGS. 9A–9C, with the openings 64 extending partially or completely through the plate 18. By preventing contact of the plate 18 with the second beam 28 the possibility for stiction of these elements can also be eliminated. Although not shown in FIGS. 9A–9C, the openings 64 can also be optionally formed at the ends of the first and third beams 20 and 32 proximate to the support posts 22 if contact between the plate 18 and the beams 20 and 32 would otherwise limit the downward extent of movement of the plate 18.

Fabrication of the second embodiment of the MEM apparatus 10 of the present invention can be performed by surface micromachining utilizing the various process steps previously described with reference to FIGS. 3A–3I. Formation of the openings 64 shown in FIGS. 9A–9C can be performed by patterning the layer of the sacrificial material 44 underneath the Poly-4 layer 56 to form mesas at the locations wherein the openings 64 are to be formed. This can be done after the CMP step and prior to depositing the Poly-4 layer 56 which is used to form the plate 18. After deposition, the Poly-4 layer 56 can be planarized by CMP to provide a flat smooth upper surface for the plate 18. When the openings or slots 64 are to be formed completely through the plate 18, this can be done by etching down through the Poly-4 layer 56 after deposition thereof.

A plurality of the MEM devices 10 according to the second embodiment of the present invention can be arrayed on a common substrate 12 in a manner similar to that previously described with reference to FIGS. 4 and 6 to form a polychromator 60 or a micromirror array 70. To form a polychromator 60, the MEM devices 10 of FIG. 8 can have a width of 2–20 $\mu$m and a length of 100–1000 $\mu$m with a plurality of the MEM devices 10 being arranged end-to-end without being physically connected together to form each grating element 62 of the polychromator 60. In this case, all the MEM devices 10 forming each grating element 62 can be wired to operate in unison.

In other embodiments of the present invention, the MEM device 10 of FIG. 8 can form a unit cell which can be repeated a plurality of times to form a single long physically interconnected grating element 62 having a continuous plate 18 of up to one centimeter long, or even longer. In this case, the first beam 20 can be merged with the third beam 32 of an adjacent unit cell to form a single beam which is supported at its midpoint by a single support post 22 in a manner similar to that shown in FIG. 9.

To form a micromirror array 70 with a plurality of MEM devices 10 according to the second embodiment of the present invention, the MEM devices 10 can be formed with lateral dimensions generally up to a few hundred microns (e.g. 20–200 $\mu$m). Such MEM devices 10 can be arranged to form a micromirror array 70 as shown in FIG. 6, with each moveable plate 18 forming a phase-shifting mirror which remains substantially coplanar with the substrate 12 while being moveable upwards and downwards in response to the magnitude of the applied voltages $V_1$ and $V_2$. Alternately, each MEM device 10 in FIG. 8 can act as a tiltable mirror by applying the actuation voltages $V_1$ and $V_2$ to only a single side of the MEM device 10 (i.e. to only one pair of the electrodes 36 and 36' at a particular instant in time, with the other pair of the electrodes 36 and 36' being electrically grounded).

Figure 10:
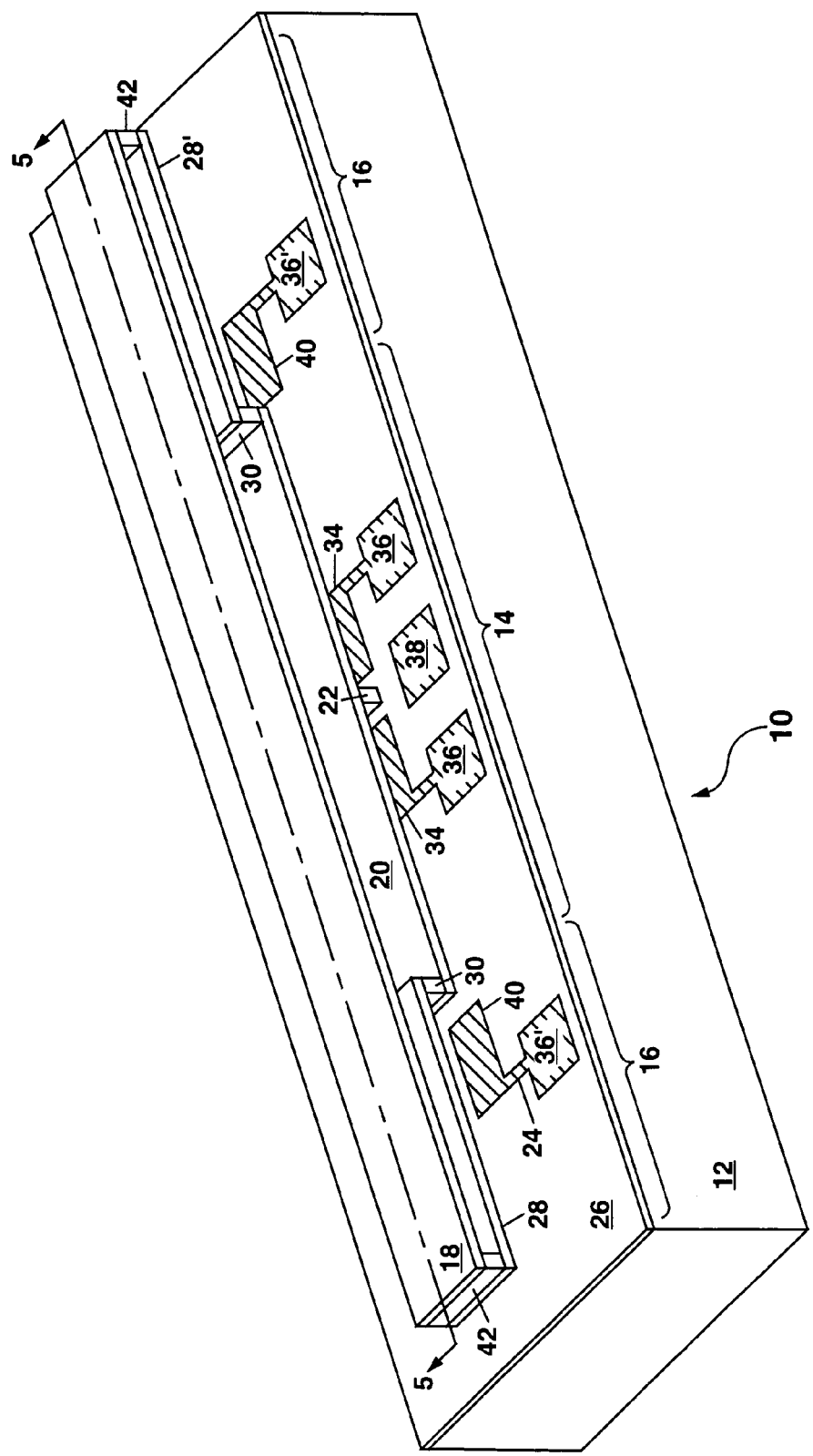
FIG. 10 shows a schematic perspective view of a third embodiment of the MEM apparatus of the present invention.

FIG. 10 shows a third embodiment of the MEM apparatus 10 of the present invention. This embodiment of the present invention is similar to that of FIG. 8 except that the first electrostatic actuator 14 comprises a single beam (i.e. the first beam 20) which is supported at its midpoint by a single support post 22. The second beam 28 is split into two substantially equal parts denoted as 28 and 28', with the plate 18 being supported on a pair of spacers 42 above the second beam as shown in FIG. 10. The width of the beams 20, 28 and 28' can be the same as the width of the plate 18 or smaller. The MEM apparatus 10 of FIG. 10 can have dimensions similar to those described previously with reference to the second embodiment of the present invention, and can be used to form a polychromator 60 or a micromirror array 70 as described previously. The MEM apparatus 10 of FIG. 10 can be fabricated by surface micromachining as described previously with reference to FIGS. 3A–3I.

Figure 11A:
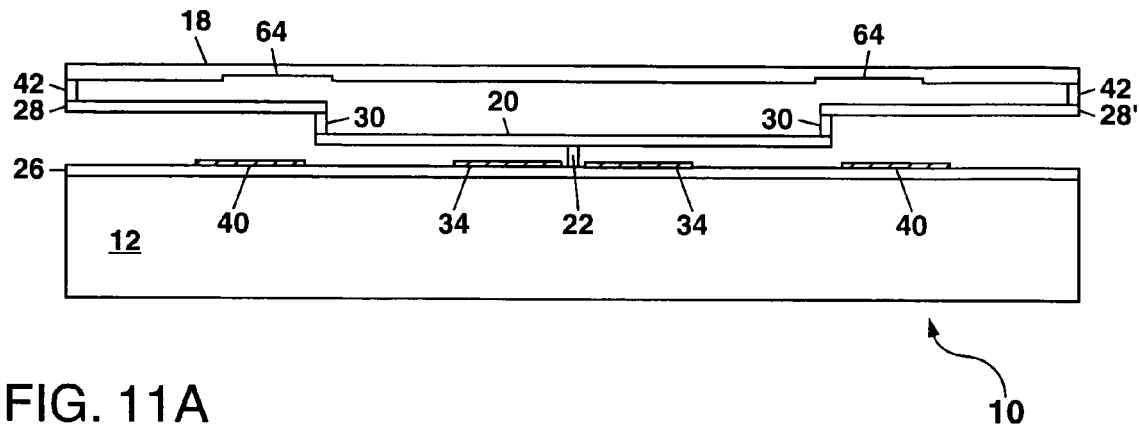
FIGS. 11A–11C show schematic cross-section views of the MEM apparatus of FIG. 10 along the section line 5—5 to illustrate operation of this third embodiment of the present invention.
Figure 11B:
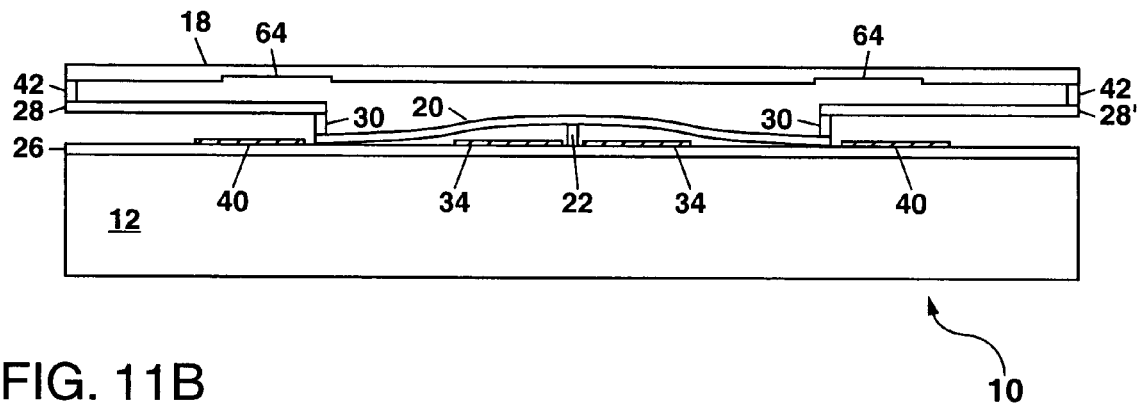
Figure 11C:
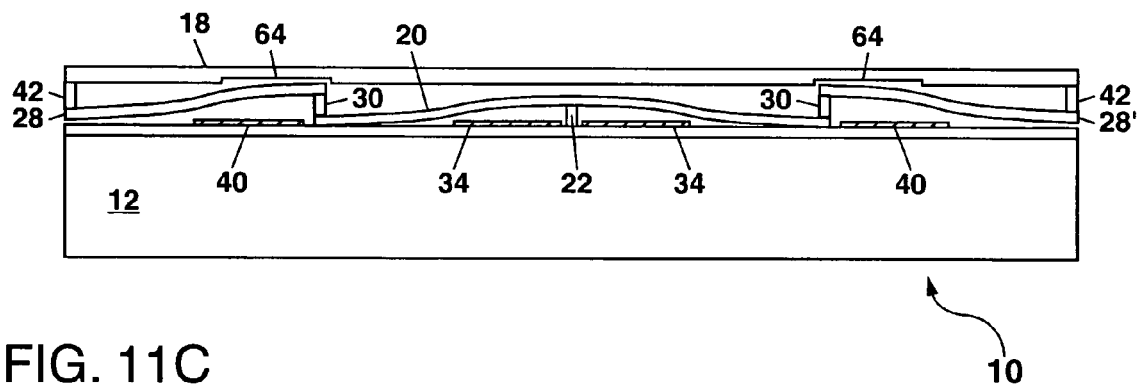

Operation of the third embodiment of the MEM apparatus 10 of the present invention can be understood with reference to FIGS. 11A–11C which show schematic cross-section views of the third embodiment of the MEM apparatus 10 along the section line 5—5 in FIG. 10. FIG. 11A shows the third embodiment of the MEM apparatus 10 in an as-fabricated state without any voltages $V_1$ and $V_2$ being applied.

In FIG. 11B, the first actuation voltage $V_1$ can be applied to the first electrostatic actuator 14 (i.e. between the first beam 20 and an underlying first set of electrodes 0.34) to urge each end of the first beam 20 downwards towards the substrate 12. This also urges the plate 18 downward due to its connection to the first beam 20.

In FIG. 11C, the application of the second actuation voltage $V_2$ to the second electrostatic actuator 16 (i.e. between the second beams 28 and 28' and an underlying second set of electrodes 40) while the voltage $V_1$ is still in place can urge the plate 18 downward still further as the beams 28 and 28' are bent downward towards the substrate 12 by the electrostatic force of attraction produced by the second actuation voltage $V_2$.

The third embodiment of the present invention in FIG. 10 can also be operated in a tilting mode by applying the voltages $V_1$ and $V_2$ to only one side of the MEM device 10. Tilting of the plate 18 to the left in FIG. 10 can be achieved by initially applying the voltage $V_1$ to the electrode 34 underlying a left-hand side of the first beam 20, with further tilting being possible by applying the voltage $V_2$ to the electrode 40 underneath the second beam 28. Tilting of the plate 18 to the right in FIG. 10 can be achieved by initially applying the voltage $V_1$ to the electrode 34 underlying a right-hand side of the first beam 20, with further tilting being possible by applying the voltage $V_2$ to the electrode 40 underneath the second beam 28'. In an alternate mode of operation, the voltages $V_1$ and $V_2$ can be simultaneously applied to each side of the MEM device 10 in FIG. 10 for tilting thereof with the voltages $V_1$ and $V_2$ in some cases being identical in magnitude and provided by a single voltage source.

The matter set, forth in the foregoing description and accompanying drawings is offered by way of illustration only and not as a limitation. The actual scope of the invention is intended to be defined in the following claims when viewed in their proper perspective based on the prior art.

What is claimed is:

1. A microelectromechanical apparatus for redirecting incident light, comprising:
   (a) a substrate;
   (b) a first electrostatic actuator formed on the substrate and comprising a first beam supported above the substrate for movement towards the substrate in response to a first actuation voltage provided to the first electrostatic actuator;
   (c) a second electrostatic actuator comprising a second beam formed above the first electrostatic actuator and attached thereto, with the second beam being moveable towards the substrate in response to movement of the first beam, and with the second electrostatic actuator providing a further movement of the second beam towards the substrate in response to a second actuation voltage provided to the second electrostatic actuator; and
   (d) a plate formed above the second electrostatic actuator and attached thereto, with the plate having a surface for reflecting the incident light to generate a reflected light component having a phase shift or a change in an angle of propagation which depends upon a movement of the plate produced by one or both of the first and second electrostatic actuators.

2. The apparatus of claim 1 wherein the first beam is supported above the substrate by a single support post.

3. The apparatus of claim 1 wherein the first beam is supported above the substrate by a plurality of support posts.

4. The apparatus of claim 1 wherein the substrate comprises silicon.

5. The apparatus of claim 1 wherein the first and second beams comprise different layers of polycrystalline silicon.

6. The apparatus of claim 1 wherein the first and second beams are arranged end-to-end.

7. The apparatus of claim 1 wherein the first and second beams are arranged side-by-side.

8. The apparatus of claim 7 wherein the first electrostatic actuator further comprises a third beam supported above the substrate for movement towards the substrate in response to the first actuation voltage, with the second beam being located between the first and third beams and attached thereto.

9. The apparatus of claim 8 wherein the second beam is attached to the first and third beams near a midpoint of each of the first and third beams.

10. The apparatus of claim 8 wherein the second beam is attached to the first and third beams near an unsupported end of each of the first and third beams.

11. The apparatus of claim 1 wherein the plate includes a mirror coating formed thereon.

12. The apparatus of claim 1 wherein the first electrostatic actuator comprises a first electrode formed on the substrate beneath a portion of the first beam.

13. The apparatus of claim 12 wherein the second electrostatic actuator comprises a second electrode formed on the substrate beneath a portion of the second beam.

14. The apparatus of claim 1 wherein the first and second actuation voltages are identical and are simultaneously applied to the first and second electrostatic actuators.

15. A microelectromechanical apparatus for redirecting incident light, comprising:
   (a) a substrate;
   (b) a plate supported above the substrate and having a light-reflecting upper surface; and
   (c) a plurality of interconnected beams located beneath the plate to support the plate and to electrostatically move the plate towards the substrate, with the plurality of interconnected beams comprising three beams formed substantially parallel to the substrate, and with the three beams including a pair of beams formed from one or two layers of polycrystalline silicon and another beam formed from a different layer of polycrystalline silicon, and with each beam having at least one electrode located beneath the beam to urge the beam towards the substrate in response to an actuation voltage provided between the electrode and the beam to move the plate towards the substrate.

16. The apparatus of claim 15 wherein the substrate comprises silicon.

17. The apparatus of claim 15 wherein the three beams are arranged end-to-end.

18. The apparatus of claim 15 wherein the three beams are arranged side-by-side.

19. The apparatus of claim 15 wherein the plate includes a mirror coating formed thereon.

20. A microelectromechanical apparatus for redirecting incident light, comprising:
   (a) a substrate;
   (b) a plate supported above the substrate and having a light-reflecting upper surface; and
   (c) a pair of electrostatic actuators formed above the substrate to support the plate for movement thereof, with the pair of electrostatic actuators comprising:
      (1) a first electrostatic actuator further comprising a pair of spaced-apart beams with each beam being connected at one or both ends thereof to the substrate, and with a first electrode being formed beneath each beam to urge the plate towards the substrate in response to an electrostatic force of attraction produced between that beam and the first electrode therebeneath; and
      (2) a second electrostatic actuator comprising another beam located above the pair of spaced-apart beams of the first electrostatic actuator and connected thereto and further being connected to the plate, and a pair of second electrodes formed beneath the beam of the second electrostatic actuator to further urge the plate towards the substrate in response another electrostatic force of attraction produced between that beam and at least one of the pair of second electrodes.

21. The apparatus of claim 20 wherein the substrate comprises silicon, and each beam comprises polycrystalline silicon.

22. The apparatus of claim 20 wherein the plate includes a mirror coating formed thereon.

23. The apparatus of claim 20 wherein the movement of the plate produces a change in tilt angle of the plate.

24. The apparatus of claim 20 wherein the movement of the plate produces a phase shift in a reflected portion of the incident light.

25. A microelectromechanical apparatus for redirecting incident light, comprising:
   (a) a substrate;
   (b) a plate supported above the substrate and having a light-reflecting upper surface; and
   (c) a pair of electrostatic actuators attached to the substrate by a single support post to electrostatically move the plate towards the substrate, with the pair of electrostatic actuators comprising:
      (1) a first electrostatic actuator further comprising a beam attached to the single support post near a midpoint of the beam, and with a pair of first electrodes being formed beneath the beam proximate to the single support post to urge the plate towards the substrate in response to an electrostatic force of attraction produced between the beam and at least one of the first electrodes located therebeneath; and (2) a second electrostatic actuator further comprising a pair of beams located above the beam of the first electrostatic actuator and attached thereto at one end of each of the pair of beams, with another end of each of the pair of beams being attached to the plate, and with a second electrode being formed beneath each of the pair of beams proximate to the beam of the first electrostatic actuator to further urge the plate towards the substrate in response to another electrostatic force of attraction produced between at least one beam of the pair of beams and the second electrode located therebeneath.

26. The apparatus of claim 25 wherein the substrate comprises silicon, and each beam comprises polycrystalline silicon.

27. The apparatus of claim 25 wherein the plate includes a mirror coating formed thereon.

28. The apparatus of claim 25 wherein the movement of the plate produces a change in tilt angle of the plate.

29. The apparatus of claim 25 wherein the movement of the plate produces a phase shift in a reflected portion of the incident light.

* * * * *